(12) United States Patent
Jens

(10) Patent No.: US 9,573,708 B2
(45) Date of Patent: Feb. 21, 2017

(54) CLIPPING MACHINE

(71) Applicant: Tipper Tie technopack GmbH, Glinde (DE)

(72) Inventor: Thomas Jens, Lütjensee (DE)

(73) Assignee: Tipper Tie technopack GmbH, Glinde (DE)

( * ) Notice: Subject to any disclaimer, the term of this patent is extended or adjusted under 35 U.S.C. 154(b) by 789 days.

(21) Appl. No.: 13/912,728

(22) Filed: Jun. 7, 2013

(65) Prior Publication Data

US 2014/0000216 A1   Jan. 2, 2014

(30) Foreign Application Priority Data

Jun. 28, 2012   (DE) .................... 20 2012 006 260 U

(51) Int. Cl.
| | |
|---|---|
| *B65B 7/06* | (2006.01) |
| *B65B 51/04* | (2006.01) |
| *A22C 11/12* | (2006.01) |
| *B65B 61/06* | (2006.01) |

(52) U.S. Cl.
CPC .............. *B65B 7/06* (2013.01); *A22C 11/125* (2013.01); *B65B 51/04* (2013.01); *B65B 61/06* (2013.01)

(58) Field of Classification Search
CPC ..... A22C 11/12; A22C 11/125; A22C 11/006; A22C 11/00; A22C 11/107; A22C 11/25; B65B 7/06; B65B 9/12; B65B 13/34; B65B 65/02; B65B 51/05; B65B 51/04; B65B 61/06
USPC ......... 452/49, 48; 53/417, 138.1–138.4, 567, 53/576
See application file for complete search history.

(56) References Cited

U.S. PATENT DOCUMENTS

| | | | |
|---|---|---|---|
| 3,383,746 A | 5/1968 | Wing et al. | |
| RE30,196 E * | 1/1980 | Velarde ................... | B65B 51/04 29/243.56 |
| 4,370,808 A * | 2/1983 | Maytham ............. | H02G 1/1226 30/353 |
| 4,450,653 A * | 5/1984 | Fletcher ................. | B24D 15/08 248/171 |
| 5,405,288 A * | 4/1995 | Stanley ................ | A22C 11/125 29/243.56 |
| 6,062,973 A * | 5/2000 | Baertlein ............. | A22C 11/125 30/228 |
| 6,182,734 B1* | 2/2001 | Ebert ...................... | B65B 51/04 156/515 |
| 6,205,747 B1* | 3/2001 | Paniagua Olaechea .. | B65B 9/15 53/138.4 |
| 6,871,474 B2* | 3/2005 | Topfer .................... | B65B 51/04 53/138.4 |

(Continued)

FOREIGN PATENT DOCUMENTS

DE   10 2004 015 892   10/2005

*Primary Examiner* — Thanh Truong
*Assistant Examiner* — Dariush Seif
(74) *Attorney, Agent, or Firm* — Christensen O'Connor Johnson Kindness PLLC

(57) ABSTRACT

The invention relates to a clipping machine for closing tubular packagings. The machine has a blade and a counter blade for severing the packaging material. Both blades are arranged on closing arms of the machine. At least one of the blades has a drive which is also situated on one of the closing arms. This and the development of the cutting edges create an effective and at the same time space-saving cutting mechanism.

24 Claims, 4 Drawing Sheets

(56) References Cited

U.S. PATENT DOCUMENTS

| | | | |
|---|---|---|---|
| 7,451,582 B2* | 11/2008 | Ebert | A22C 11/125 53/138.2 |
| 7,708,624 B2* | 5/2010 | Ebert | B65B 51/04 452/48 |
| 2003/0073397 A1 | 4/2003 | Stanley et al. | |
| 2004/0250509 A1* | 12/2004 | May | B65B 25/064 53/138.4 |
| 2006/0042185 A1* | 3/2006 | May | B65B 9/15 53/138.4 |
| 2006/0075722 A1* | 4/2006 | Gupton | A22C 11/125 53/417 |
| 2007/0012813 A1* | 1/2007 | Topfer | A22C 11/125 242/563.2 |
| 2007/0281597 A1* | 12/2007 | Bontjer | A22C 11/006 452/49 |
| 2008/0085668 A1* | 4/2008 | Ebert | A22C 11/125 452/46 |
| 2008/0227377 A1* | 9/2008 | Duringer | B65B 51/04 452/49 |
| 2013/0189912 A1* | 7/2013 | Ebert | A22C 11/02 452/35 |

* cited by examiner

CLIPPING MACHINE

RELATED APPLICATION

This application claims priority to German Application Serial No. 20 2012 006 260.3, filed Jun. 28, 2012, the contents of which are hereby incorporated by reference as if recited in full herein.

The invention relates to a clipping machine according to the preamble of Claim 1. Such machines are used above all in the production of sausages. The tubular packaging is then formed by a sausage casing which is filled with sausage meat. The packaging can already be closed at the one end such that it is bag-shaped. The sausage casing is gathered radially portion by portion such that a plait with a small diameter is produced. In the case of automatic double clipping machines such as the machine according to the invention, two clips axially spaced apart are placed onto the gathered casing portions. The clips are bent around the casing such that clip closures are formed. One of them closes the end of the sausage in front and the other closes the start of the one that follows. The casing is then normally separated by way of a blade between the clip closures such that the sausage in front is severed from the casing.

Normally the casing is tensioned firmly enough such that it is able to be cut through by an open blade. A counter edge or the like is not necessary (US 2003/0073397 A1). Occasionally, however, packagings are really resilient or are difficult to cut because of additionally having a mesh. For these cases it is known to guide linearly moved blades along shearing plates such that shearing occurs (US 2006/075722 A1). The stroke necessary for this though involves a considerable requirement for space, which is why said design is only used in the case of certain types of machine. It is little suited in particular to clipping machines with two pivotable closing arms. So that the blade is able to move into the closing zone, it has to be pivoted together with the linear drive and the guide means, which requires a large amount of space.

The object underlying the invention is to create an effective and at the same time space-saving cutting mechanism for a clipping machine with pivotable closing arms. It achieves said object by means of the features of Claim 1. The sub-claims include advantageous further developments of the invention.

The invention is based, on the one hand, on the knowledge that the blade drive can be arranged in a particularly space-saving manner on one of the closing arms when it is designed for a pivoting movement of the blade. When viewed in the direction of the tube axis of the packaging, it is possible to arrange the motor, the drive train and the blades along the arm and for them to be pivoted with said arm such that all in all a smaller space is required. In the case of a pivoting movement, however, the force exerted by the blade onto the packaging is not constant. The packaging can slide along the cutting edge. In order, nevertheless, to ensure secure severing, a special design of the counter blade, described in Claim 1, and of the relative movement of the blades with respect to one another is necessary.

Gathering devices according to the invention can be provided with or without guide devices for clips. They can be realized as expanding displacement means, for instance by one gathering device or both gathering devices being able to be moved axially away from one another after the gathering process in order to form a charge-free packaging plait.

Closure arms are arms which bring about the bending operation when forming the clip closure. For this purpose, they can carry closing tools, that is plungers or dies, or can take on a guiding task during the bending operation.

A pivoting movement in terms of the invention is a movement about a pivot axis which, in turn, is able to be moved. The pivot axes for the pivoting movements of the closure arms, however, are preferably non-movable in relation to the clipping machine. In addition, it is advantageous when the pivot axis for the pivoting movement of the cutting blade is non-movable in relation to the closing arm which carries the cutting device. The pivot axes of the closing arms can coincide or can also diverge. In the latter case, however, it is nevertheless preferred for them to be oriented in parallel.

An acute wedge angle is an angle of less than 90°.

In an advantageous manner, the blade drive includes a lever where the cutting blade is arranged on the load arm and a motor acts on the power arm. Using such a lever, the space-saving arrangement striven for can be achieved particularly well.

In a preferred manner the blade drive includes a linear motor. This simplifies the structure. In this case, it is further advantageous when the linear motor is a pneumatic cylinder with a plunging piston. Said drive is particularly low-maintenance. A sufficient driving force can be set up and tuned in particular to the lever by selecting the diameter of the piston.

In an advantageous manner, the counter blade is connected in a rigid manner to the closing arm, which simplifies the method of construction and makes it reliable.

It is further advantageous when the cutting plane is at right angles to the tube axis. The space requirement is particularly small in this case.

In a preferred manner, the cutting edge of at least one of the blades extends along a straight line, in a further preferred manner the cutting edges of the other blade also. This also simplifies the structure.

In an advantageous manner, the angle $\alpha$ between the tangents of the two cutting edges at the point of intersection (FIG. 4) does not exceed 45°, preferably not 30°, further preferably not 20° and even further preferably not 10° during its course from the initial cutting point to the end cutting point. This reduces the risk of the packaging slipping along the cutting edges during the cutting process.

In a preferred manner the wedge angle in the case of at least one of the blades, in a preferred manner in the case of both blades, is constant along the cutting edge. This means a uniform cutting action is achieved.

In an advantageous manner, the wedge angle is not in excess of 30°, preferably is not in excess of 20°, further preferably is not in excess of 10° and even further preferably is not in excess of 5°. Said small angles have proved particularly suitable for packaging material, in particular sausage casings and associated meshes.

An exemplary embodiment of the invention is explained in more detail below by way of drawings, in which.

Figure 1:
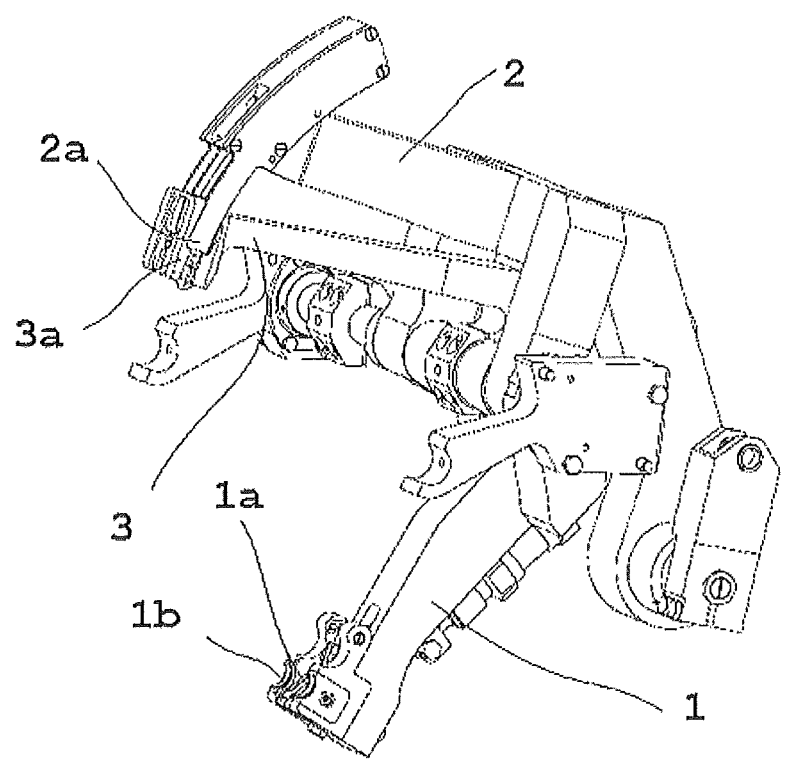
FIG. 1 shows a perspective view of part of a clipping machine according to the invention.
Figure 2:
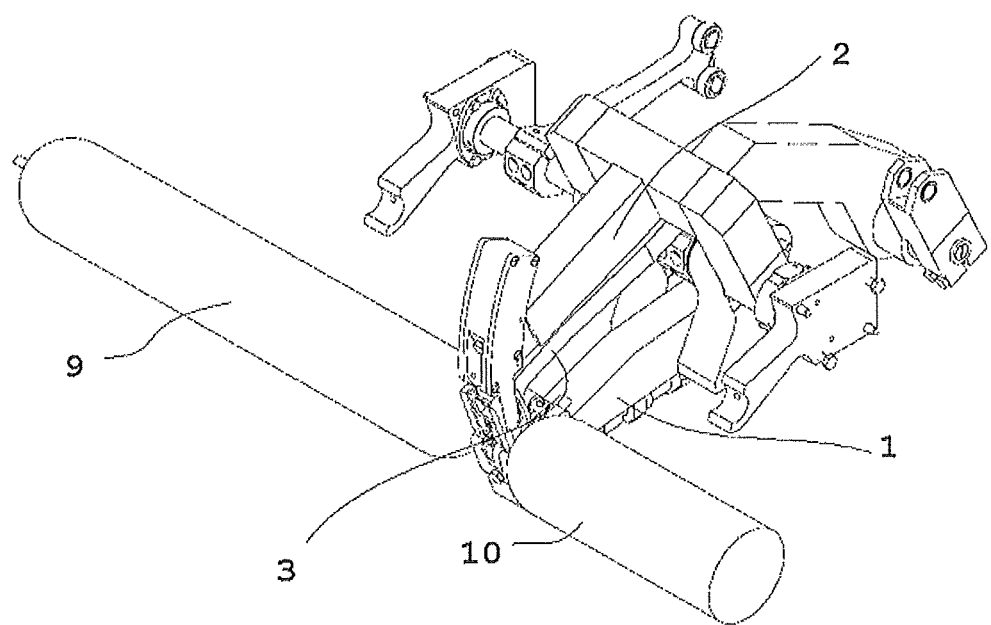
FIG. 2 shows the same part when closing a tubular packaging.

FIG. 1 shows three closing arms 1, 2 and 3. The bottom closing arm 1 carries two dies 1a and 1b on its end. The top closing arm 2 carries on its end two plungers, one 2*a* of which can be seen. Below the top closing arm 2 there is a third closing arm 3 which carries at its end a holder 3*a* for clips in order to convey the clips from the end (not shown) of the magazine apparatuses to the closing points above the pivoted-in dies 1*a* and 1*b* and to hold them during the start of the bending operation. Gathering devices are situated axially next to the closing arms 1, 2 and 3 and for reasons of clarity are not shown. FIG. 2 shows the pivoted-in closing arms 1, 2 and 3 as well as tubular packagings 9 and 10 which have already been gathered together. The one tubular packaging 9 has already been closed at its front end. The tail end has already been closed together with the end of the further packaging 10 in front by a clip (not visible) being bent around each of said two ends. The packagings 9, 10 are to be separated from one another between the two closing points.

Figure 3:
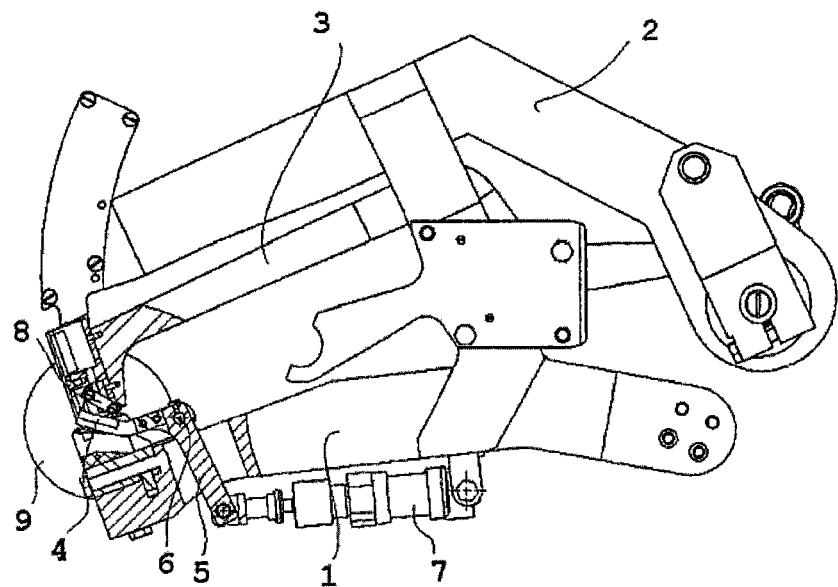
FIG. 3 shows a unit drawing of the same part.
Figure 4:
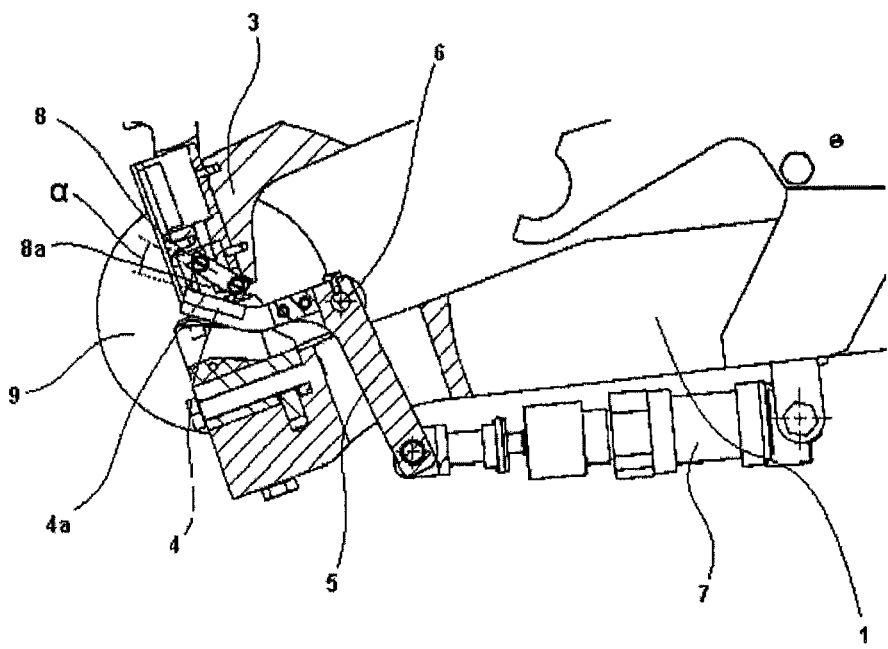
FIG. 4 shows an enlarged detail from FIG. 3.

It can be seen in FIGS. 3 and 4 that a blade 4 is arranged on the bottom closing arm 1. Said blade is arranged on the load arm of a lever 5, which is fastened at a pivotal point 6 arranged on a bottom closing arm 1, and is consequently pivotable. A linear motor in the form of a pneumatic cylinder 7 with a plunging piston, which is also arranged on the closing arm 1, cooperates with the power arm of the lever 5. Consequently, the entire blade drive is arranged on the closing arm 1. The particular advantage of this is that the pivoting movement of the closing arm 1 is utilized at the same time for the adjustment of the blade 4. This makes a more compact method of construction possible.

Figure 5:
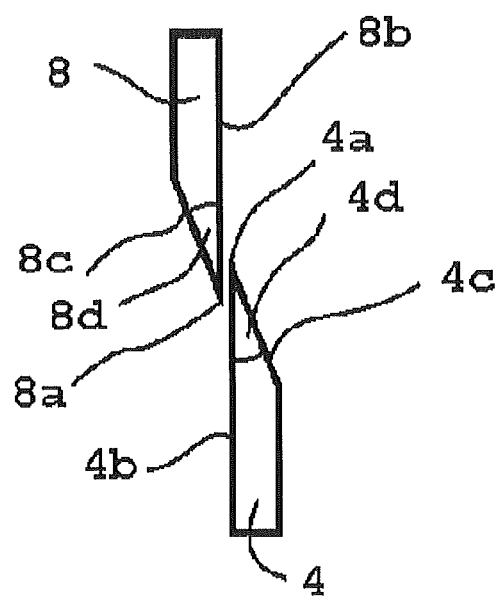
FIG. 5 shows schematic profile views of the blade according to the invention.

A counter blade 8 is connected in a rigid manner to the closing arm 3. Both blades 4, 8 are arranged such that their straight cutting edges 4*a*, 8*a* are in one plane at right angles to the axis of the tubular packaging 9. The cutting plane is consequently at right angles to the tube axis. It can also be seen that the angle α between the tangents of the two cutting edges 4*a*, 8*a* (see FIG. 4) is not more than 20° during the entire cutting operation. The parallel cutting faces 4*b* and 8*b* as well as the wedge faces 4*c* and 8*c* can be seen in FIG. 5. The wedge angles 4*d*, 8*d* are in each case constant and smaller than 30°.

The invention claimed is:

1. A clipping machine for closing tubular packagings having a tube axis, said clipping machine having gathering devices for gathering together the packaging and at least two closing arms which are set up to carry out a pivoting movement toward the gathered-together packaging from different directions, and a cutting device is arranged on one of the closing arms for severing the gathered-together packaging between closing points, said cutting device including a cutting blade and a blade drive which is set up such that the cutting blade carries out a pivoting movement through the tube axis between the closing points, characterized in that a counter blade is arranged on another closing arm, wherein the two blades have cutting edges which extend parallel to a cutting plane which intersects the tube axis between the closing points and is situated between the blades on their sides facing one another, the blades have parallel cutting faces to which wedge faces connect on the other side of the cutting edges, wherein cutting faces and wedge faces contact one another at an acute wedge angle, and the blade drive is set up in such a manner that the cutting blade is moved parallel to the cutting plane past the counter blade such that a point of intersection of the cutting edges moves from an initial cutting point in front of one side of the gathered-together packaging to an end cutting point on the other side of the gathered-together packaging, further characterized in that the blade drive includes a lever comprising a load arm portion and a power arm portion where the cutting blade is arranged on the load arm portion and a motor acts on the power arm portion, and wherein the lever is pivotably attached to a lower one of the at least two closing arms adjacent the load arm portion and pivotably attached to the blade drive adjacent the power arm portion.

2. The clipping machine according to claim 1, characterized in that the counter blade is connected in a rigid manner to the closing arm on which the counter blade is arranged.

3. The clipping machine according to claim 1, characterized in that the cutting plane is at right angles to the tube axis.

4. The clipping machine according to claim 1, characterized in that the cutting edge of at least one of the blades extends along a straight line.

5. The clipping machine according to claim 4, wherein the cutting edges of both blades extend along a straight line.

6. The clipping machine according to claim 1, characterized in that an angle between tangents of the two cutting edges at the point of intersection does not exceed 45°, during its course from the initial cutting point to the end cutting point.

7. The clipping machine according to claim 6, characterized in that the angle between the tangents of the two cutting edges at the point of intersection does not exceed 30° during its course from the initial cutting point to the end cutting point.

8. The clipping machine according to claim 6, characterized in that the angle between the tangents of the two cutting edges at the point of intersection does not exceed 20° during its course from the initial cutting point to the end cutting point.

9. The clipping machine according to claim 6, characterized in that the angle between the tangents of the two cutting edges at the point of intersection does not exceed 10° during its course from the initial cutting point to the end cutting point.

10. The clipping machine according to claim 1, characterized in that the wedge angle of at least one of the blades is constant along the cutting edge.

11. The clipping machine according to claim 10, characterized in that the wedge angle of both blades-is constant along the cutting edge.

12. The clipping machine according to claim 1, characterized in that the wedge angle of at least one of the blades is not in excess of 70°.

13. The clipping machine according to claim 12, wherein the wedge angle of both blades is not in excess of 70°.

14. The clipping machine according to claim 12, characterized in that the wedge angle of at least one of the blades is not in excess of 50°.

15. The clipping machine according to claim 12, characterized in that the wedge angle of at least one of the blades is not in excess of 40°.

16. The clipping machine according to claim 12, characterized in that the wedge angle of at least one of the blades is not in excess of 30°.

17. The clipping machine according to claim 12, wherein the wedge angle of both blades is not in excess of 50°.

18. The clipping machine according to claim 12, wherein the wedge angle of both blades is not in excess of 40°.

19. The clipping machine according to claim 12, wherein the wedge angle of both blades is not in excess of 30°.

20. A clipping machine for closing tubular packagings having a tube axis, said clipping machine having gathering devices for gathering together the packaging and at least two closing arms which are set up to carry out a pivoting movement toward the gathered-together packaging from different directions, and a cutting device is arranged on one of the closing arms for severing the gathered-together packaging between closing points, said cutting device including a cutting blade and a blade drive which is set up such that the cutting blade carries out a pivoting movement through the tube axis between the closing points, characterized in that a counter blade is arranged on another closing arm, wherein the two blades have cutting edges which extend parallel to a cutting plane which intersects the tube axis between the closing points and is situated between the blades on their sides facing one another, the blades have parallel cutting faces to which wedge faces connect on the other side of the cutting edges, wherein cutting faces and wedge faces contact one another at an acute wedge angle, and the blade drive is set up in such a manner that the cutting blade is moved parallel to the cutting plane past the counter blade such that a point of intersection of the cutting edges moves from an initial cutting point in front of one side of the gathered-together packaging to an end cutting point on the other side of the gathered-together packaging, further characterized in that the blade drive includes a linear motor attached to a lower one of the at least two closing arms and a load arm is pivotably attached to a forward end of the linear motor under the lower one of the at least two closing arms.

21. The clipping machine according to claim 20, characterized in that the linear motor is a pneumatic cylinder with a plunging piston.

22. A clipping machine for closing tubular packagings having a tube axis, comprising:

a lower closing arm and at least one upper closing arm, each of which pivot toward a gathered-together packaging, wherein the at least one upper closing arm pivots down from above the gathered-together packaging and the lower closing arm comprises at least one clip die on an upwardly facing end thereof and pivots upward from below the gathered-together packaging; and a cutting device held by the lower closing arm, the cutting device comprising a cutting blade residing adjacent the at least one clip die and facing the at least one upper closing arm, the cutting device further comprising a lever with an upper end portion that is attached to the cutting blade and that is pivotably attached to a front end portion of the lower closing arm;

a blade drive residing below and attached to the lower closing arm and pivotably attached to the lever of the cutting device below the cutting blade such that the cutting blade carries out a pivoting movement through the tube axis between closing points in response to the lower arm pivoting upward as the blade drive extends outward from a home position; and a counter blade on the upper closing arm, wherein the two counter blade and the cutting blade have cutting edges which extend parallel to a cutting plane which intersects the tube axis between the closing points and is situated between the blades on their sides facing one another, wherein the blades have parallel cutting faces to which wedge faces connect on an opposing side of the cutting edges, wherein cutting faces and wedge faces contact one another at an acute wedge angle, wherein the blade drive moves the cutting blade parallel to the cutting plane past the counter blade such that a point of intersection of the cutting edges moves from an initial cutting point in front of one side of the gathered-together packaging to an end cutting point on the other side of the gathered-together packaging.

23. The clipping machine of claim 22, wherein the at least one upper closing arm is a first upper closing arm and a second upper closing arm residing under the first upper closing arm, the second upper closing arm comprising a holder for clips that aligns with the clip die of the lower closing arm.

24. The clipping machine of claim 22, wherein the counter blade is rigidly held by the second upper closing arm in cooperating alignment with the cutting blade.

* * * * *